United States Patent
Bates et al.

(10) Patent No.: US 7,945,684 B2
(45) Date of Patent: May 17, 2011

(54) SPAM RISK ASSESSMENT

(75) Inventors: Cary Lee Bates, Rochester, MN (US); Jason J. Illg, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/425,488

(22) Filed: Jun. 21, 2006

(65) Prior Publication Data

US 2007/0299916 A1    Dec. 27, 2007

(51) Int. Cl.
*G06F 15/16*    (2006.01)
*G06F 15/173*    (2006.01)
*G06F 11/00*    (2006.01)

(52) U.S. Cl. ............................ 709/229; 709/225; 726/22

(58) Field of Classification Search .................. 709/206, 709/225, 229, 245; 370/351, 356; 726/22
See application file for complete search history.

(56) References Cited

U.S. PATENT DOCUMENTS

| | | | |
|---|---|---|---|
| 2006/0253583 A1* | 11/2006 | Dixon et al. .................. | 709/225 |
| 2007/0121596 A1* | 5/2007 | Kurapati et al. .............. | 370/356 |

* cited by examiner

*Primary Examiner* — Peling A Shaw
(74) *Attorney, Agent, or Firm* — Wood, Herron & Evans, LLP

(57) ABSTRACT

An apparatus, program product and method assess a spam risk associated with submission of a user's private information to an entity such as a web site. For example, the spam risk associated with an entity accessible over an electronic communications medium may be assessed by monitoring an account of a user for receipt of unsolicited communications from the entity in response to the user submitting private information solicited by the entity, and determining a spam risk for the entity based upon the monitoring.

24 Claims, 4 Drawing Sheets

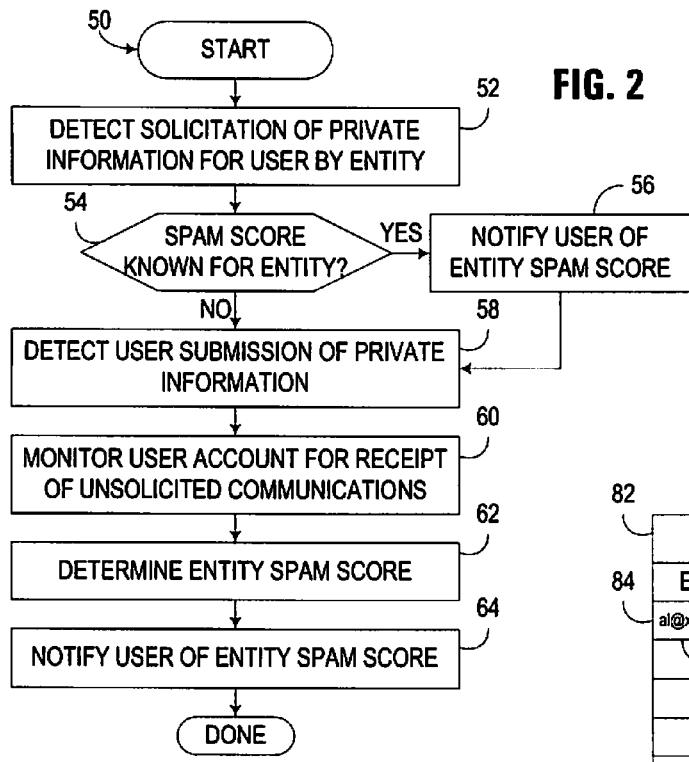
FIG. 2
FIG. 4
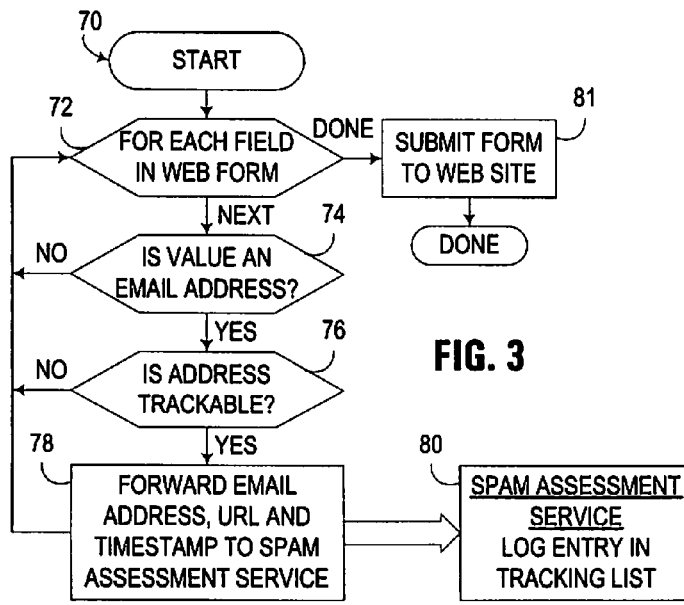
FIG. 3
FIG. 5

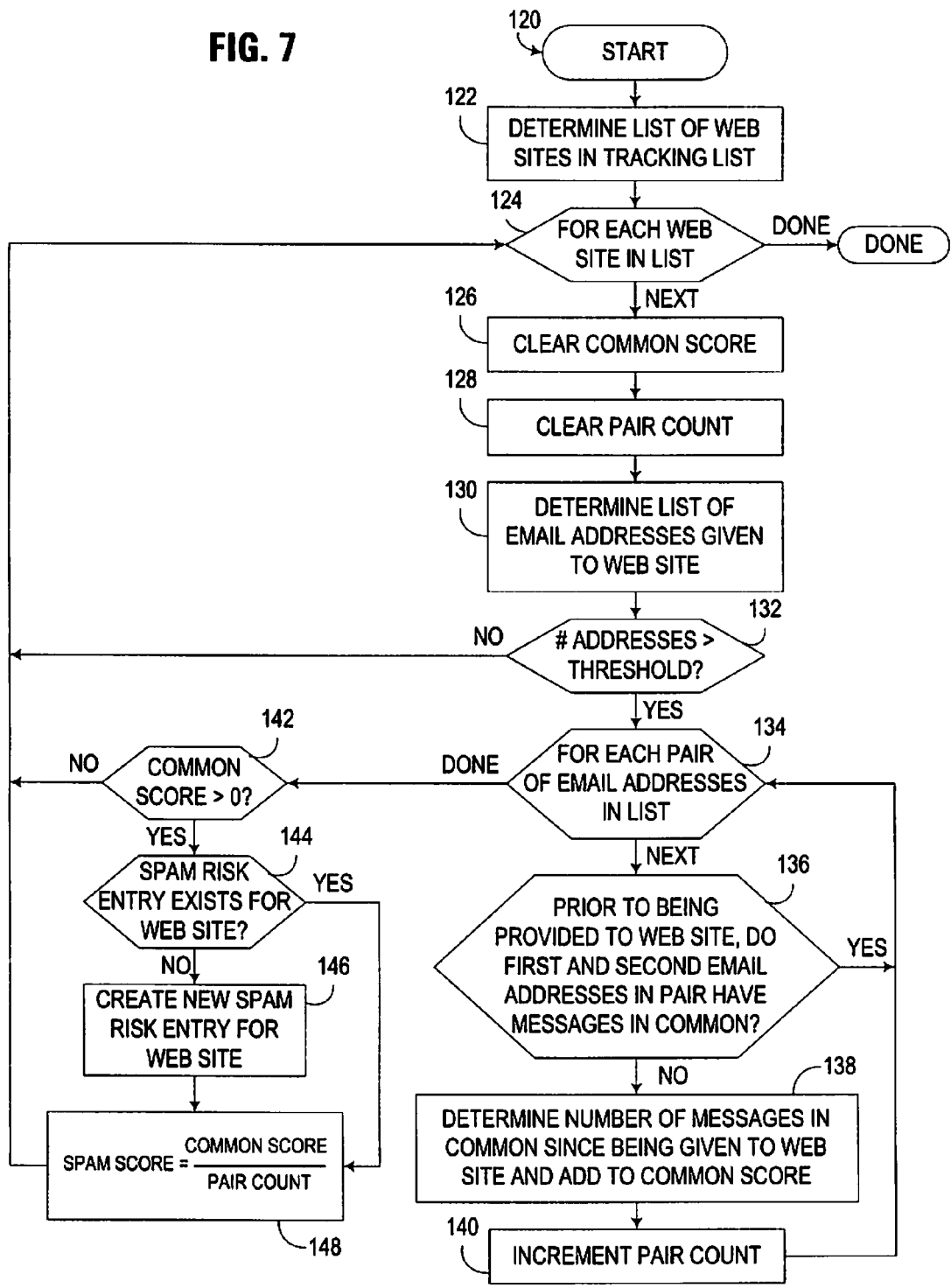

SPAM RISK ASSESSMENT

FIELD OF THE INVENTION

The present invention generally relates to computers and computer software, and more particularly, to privacy and spam avoidance tools and services.

BACKGROUND OF THE INVENTION

The Internet has grown at a remarkable pace, and has become firmly entrenched in nearly all aspects of society. Whereas the Internet initially was limited to purely academic and government endeavors, the Internet has now become an important avenue of commercial activity, not to mention an important source of educational, commercial and entertainment-related information. Moreover, in addition to simply operating as a source of information, the Internet provides a mechanism for bringing together individuals and entities from across the globe. As an example, for business enterprises, the Internet provides the ability to interact electronically with customers, as well as suppliers, distributors and other business partners. Even in non-commercial areas, the Internet enables individuals sharing common interests and avocations to interact and share information with one another.

The Internet has also fostered a growth in electronic communications. Individuals are now able to communicate quickly and conveniently with one another using electronic mail, or email, as well as via instant messaging, text messaging, voice messaging, video messaging, etc. With email, for example, a central messaging service, typically implemented in one or more mail servers, maintains accounts for multiple users, with each account being associated with a particular email address. Often, the messaging service is associated with a particular domain, such that all of the email accounts managed by the service share a common domain. Users are able to send emails to other users by addressing emails to the specific email addresses of the other users, which may then be retrieved by those users via various types of protocols, e.g., HTTP or web-based mail, POP, IMAP, etc. A user's emails are typically downloaded to a web browser or mail client by connecting to the messaging service, enabling users to view their emails, reply or forward those emails to others, create new emails, and perform various other email management operations.

While the increasingly pervasive nature of electronic communications have provided significant benefits to users of the Internet, it also has brought with it a significant problem in the eyes of many individuals—unsolicited communications such as junk email, often derisively referred to as "spam." In particular, the Internet has become an important medium through which commercial entities can effectively market their goods and services to potential customers. Electronic dissemination of advertisements is both fast and relatively inexpensive, since the content is often purely digital in nature. Unsolicited, direct market email messages, for example, can often be sent to thousands or millions of individuals at a time for extremely low cost. In addition, as new forms of electronic communications such as instant messaging, text messaging, etc. increase in popularity, advertisers will undoubtedly exploit these other avenues to reach consumers with unsolicited advertisements and other communications. Furthermore, spam is not expected to be limited to electronic textual or pictorial communications, as unsolicited communications may also incorporate voice, video, etc. In this regard, the term "spam" may be considered to incorporate unsolicited communications of any form, including emails, instant messages, video messages, text messages, and even telephone calls or direct non-electronic mail.

As a result of the increasing frustration that many individuals experience as a result of spam, significant efforts have been directed toward the development of privacy and spam avoidance tools to attempt to reduce the amount of spam received by individuals. In many instances, such tools rely on filtering to attempt to identify and block likely spam. Such filters typically are based upon analysis of the origination address of the communications, and in some instances, based upon the content of the communications. In both instances, however, spammers have developed workarounds that make it difficult to detect spam. For example, origination addresses can be spoofed so that the true sender is masked. Also, spammers often purposely misspell words that might trigger spam detection, but which are still understandable by an individual despite the misspelling. While filtering technology has improved substantially, spammers continue to develop new ways to thwart spam filters, so spam filter developers find themselves locked in a continual cat and mouse game with spammers.

An individual cannot be spammed unless a spammer has a valid address for that individual, and as a result, spammers expend significant efforts building mailing lists of valid addresses. More sophisticated individuals will of course not voluntarily give their addresses or any other private information about themselves to a spammer, so in some instances, deception may be used to obtain addresses or other private information that may be used to ascertain individuals' addresses.

As one example, individuals are often solicited for their email addresses and other private or personal information when visiting web sites. In many instances, this solicitation is simply necessary to enable the entity that controls the web site to provide information that has been requested by visitors to the web site. In an ecommerce application, for example, a web site may request an email address from a consumer making a purchase on the web site to enable the web site to forward a receipt and/or shipping notification to the consumer.

In some instances, however, the submission of an email address to a web site may result in the use of that email address for unsolicited communications, e.g., if the web site chooses to send advertisements to its prior customers. Moreover, the email address may be sold or otherwise provided to direct marketers or other third parties, who may then send their own unsolicited communications. Due to the number of potential parties involved, and the relatively minimal costs of spam emails and the like, a significant risk exists that an individual submitting an email address to a web site could begin receiving tens or hundreds of spam emails from numerous entities.

Many web sites subscribe to privacy policies and give visitors assurances that they will not use their private information for other uses. However, some less reputable entities may nonetheless misuse private information irrespective of any privacy policies that are in place, so privacy policies only provide limited assurances to individuals that their private information will not be misused.

Consequently, a significant need has arisen in the art for addressing individuals' justifiable trepidation over being spammed as a result of submitting email addresses and other private information to unknown entities such as web sites and the like.

SUMMARY OF THE INVENTION

The invention addresses these and other problems associated with the prior art by providing an apparatus, program product and method that assess a spam risk associated with submission of a user's private information to an entity such as a web site. In particular, embodiments consistent with the invention assess the spam risk associated with an entity accessible over an electronic communications medium by monitoring an account of a user for receipt of unsolicited communications from the entity in response to the user submitting private information solicited by the entity, and determining a spam risk for the entity based upon the monitoring.

In some embodiments consistent with the invention, for example, the email accounts of one or more users may be monitored to detect increased email traffic after users submit their email addresses an entity such as a web site. The content and or activity levels of emails received into the accounts may then be analyzed to ascertain the likelihood that submission of an email address to the web site has resulted in a user receiving unsolicited emails from a party associated with that web site. The analysis may be performed using multiple email accounts so that different users that visit the web site may be alerted to a potential spam risk associated with that web site, such that those users may be warned against submitting their email addresses to the web site. Furthermore, in some embodiments, spam assessment may be implemented at least in part using toolbars that are resident in the browsers of different users, and that communicate with a spam assessment service that assesses spam risk on behalf of multiple users.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 2 is a flowchart illustrating the steps in a spam assessment process capable of being performed using the computer system of FIG. 1.

FIG. 3 is a flowchart illustrating the program flow of a web form processing routine executed by the browser referenced in FIG. 1.

FIG. 4 is a block diagram of an exemplary tracking list data structure utilized by the spam assessment service referenced in FIG. 1.

FIG. 5 is a block diagram of an exemplary spam risk list data structure utilized by the spam assessment service referenced in FIG. 1.

FIG. 7 is a flowchart illustrating the program flow of a spam risk assessment routine executed by the spam assessment service referenced in FIG. 1.

DETAILED DESCRIPTION

The herein-described embodiments assess a spam risk associated with the submission of private information to an entity such as a web site. Spam risk, in this regard, refers to a metric representing the absolute or relative risk that the submission of private information to a particular entity will result in the reception of unsolicited communications from that entity or another entity that has received private information from that receiving the private information. The spam risk may be represented as a numerical value, a percentage, a ranking, or practically any other metric that informs or alerts an individual as to the potential risk that the individual may receive unsolicited communications as a result of submitting private information to an entity.

Embodiments discussed hereinafter will focus upon the solicitation of email addresses associated with email accounts by entities such as web sites. It will be appreciated, however, that the invention may be utilized in connection with other types of private information, such as name, geographical address, instant messaging address, telephone number, home page, or any other type of information that may be used to enable unsolicited communications to be directed to an individual's account. The private information, for example, may include an address that is uniquely tied to an account, or to other information that can be used to obtain the address, e.g., via additional searching or analysis. Furthermore, the account to which unsolicited communications may be directed will typically depend upon the particular type of unsolicited communications that may be generated by a spammer or other entity, e.g., email accounts for spam emails, instant messaging accounts for spam instant messages, telephone lines for telemarketing calls, or other accounts tied to unsolicited communications such as video messages, audio messages, non-electronic mail, etc. It will also be appreciated that the electronic communications medium over which the unsolicited communications may be received will typically vary based upon the type of account, e.g., the medium may be the Internet for spam email and spam instant messages.

Moreover, it will be appreciated that the invention may be utilized in connection with solicitations of private information from entities other than web sites, e.g., solicitations via email, via instant messaging, via message board or forum, or practically any other situation where private information may be solicited over an electronic communications medium.

Figure 1:
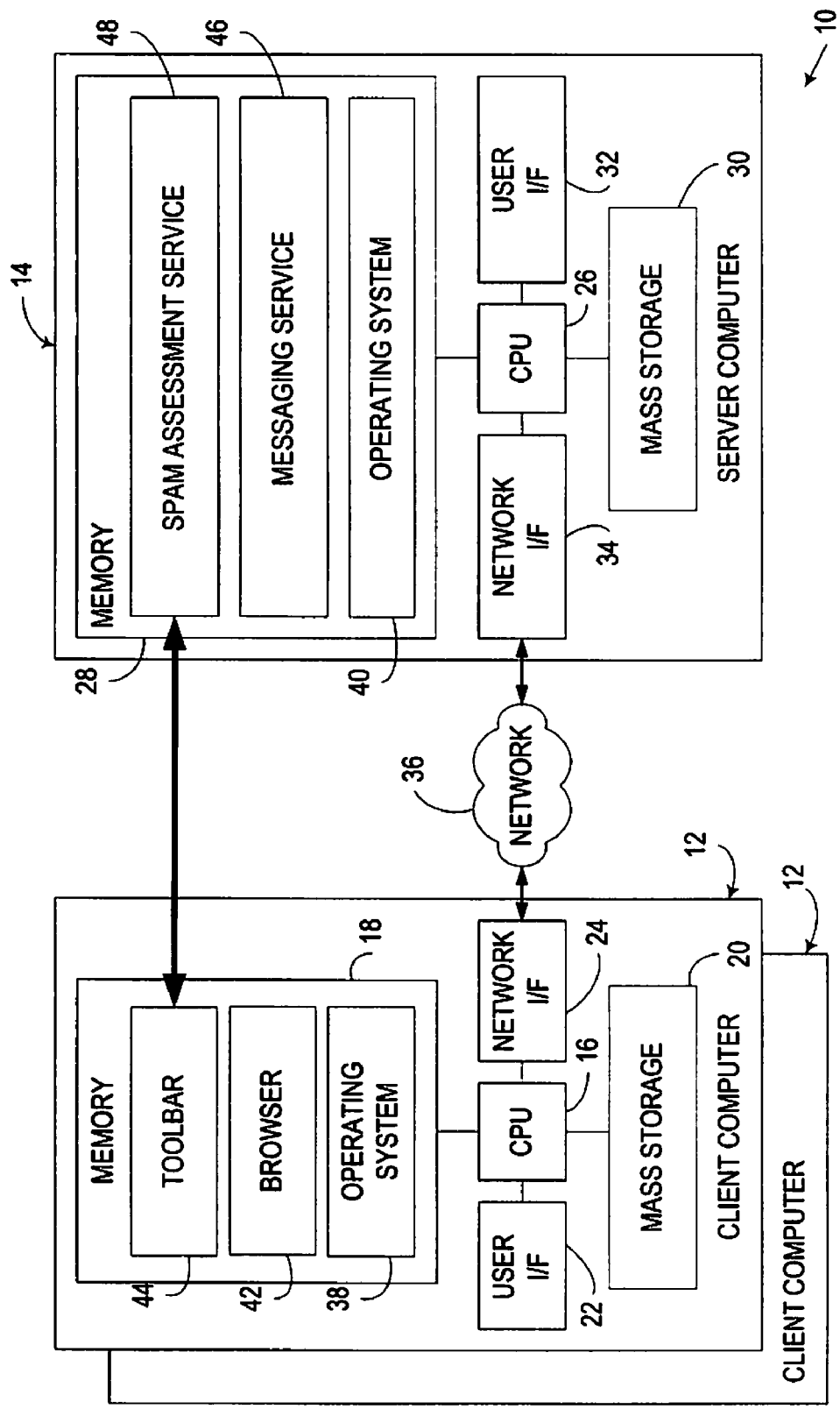
FIG. 1 is a block diagram of a computer system incorporating a spam risk assessment system consistent with the invention.

Turning now to the Drawings, wherein like numbers denote like parts throughout the several views, FIG. 1 illustrates an exemplary computer system 10 within which spam risk assessment may be performed in a manner consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Moreover, each computer 12, 14 may be implemented using one or more networked computers, e.g., in a cluster or other distributed computing system. Moreover, as is common in many client-server systems, typically multiple client computers 12 will be interfaced with a given server computer 14. In the alternative, spam risk assessment consistent with the invention may be implemented within a single computer or other programmable electronic device, e.g., a single-user computer or a multi-user computer.

Client computer 12 typically includes a central processing unit 16 including at least one microprocessor coupled to a memory 18, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 18 may be considered to include memory storage physically located elsewhere in computer 12, e.g., any cache memory in a processor in CPU 16, as well as any storage capacity used as a virtual memory, e.g., as stored on a mass storage device 20 or on another computer coupled to computer 12. Client computer 12 also typically receives a number of inputs and outputs for communicating information externally. For interface with a user or operator, client computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, client computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, client computer 12 may include an interface 24 with one or more networks (e.g., a LAN, a WAN, a wireless network, and/or the Internet, among others) to permit the communication of information with other computers and electronic devices. It should be appreciated that client computer 12 typically includes suitable analog and/or digital interfaces between CPU 16 and each of components 18, 20, 22 and 24 as is well known in the art.

In a similar manner to client computer 12, server computer 14 includes a CPU 26, memory 28, mass storage 30, user interface 32 and network interface 34. However, given the nature of computers 12 and 14 as client and server, in many instances server computer 14 will be implemented using a multi-user computer such as a server computer, a midrange computer, a mainframe, etc., while client computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public (e.g., the Internet) and/or private, wired and/or wireless, local and/or wide-area, etc.

Each computer 12, 14 operates under the control of an operating system 38, 40, and executes or otherwise relies upon various computer software applications, components, programs, objects, modules, data structures, etc. Moreover, various applications, components, programs, objects, modules, etc. may also execute on one or more processors in another computer coupled to computer 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

FIG. 2 illustrates the steps in a spam assessment process 50 capably of being performed to assess spam risk in a manner consistent with the invention. The process begins in block 52 by detecting the solicitation of private information for a user by an entity. For example, the detected solicitation may be via the detection of a web form in a web site, or in other suitable manners appropriate for the particular entity making the solicitation. Block 54 then determines whether a spam score is already known for the entity. If so, control passes block 56 to notify the user of the entity spam score, and thus alert the user as to the relative risk presented by the entity, prior to the user submitting any private information to that entity. Consequently, in the event that a spam score is already known for the entity prior to a user submitting private information to that entity, that user may choose to not submit any private information if a high risk of spam exits.

After a user is notified of an entity spam score, or alternatively, if no spam score is known, control passes to block 58 to detect user submission of private information. For example, in the instance that private information is solicited over a web form, the user submission may be detected, for example, based upon a user clicking on a "submit" button on the web form after private information has been entered by the user.

Next, in block 60, a user account associated with the private information that has been submitted is subsequently monitored for receipt of unsolicited communications. Then, in block 62, based upon such monitoring, a spam score is determined for the entity, either based entirely on the monitoring of the user's account, or based upon monitoring of the user's account along with monitoring of other users' accounts. Thereafter, the user may be notified of the entity spam score, as illustrated in block 64. It will be appreciated that in some implementations, the user may not be notified until such time as the user is solicited for private information. Moreover, the notification of an entity spam score may be to a different user from that for which monitoring has been performed.

The process illustrated in FIG. 2 may be implemented in a number of manners, including locally on a client computer, or using a central service that either fully implements the process or implements the process in conjunction with a client computer. FIGS. 3-7, for example, illustrate one implementation of the invention in a distributed environment, whereby a central service communicates with toolbars that are resident in client browsers to implement the various spam assessment functions described herein. Moreover, in the illustrated implementation, the entity that solicits private information is a web site, and the private information includes an email address that is associated with an email account of the user. As such, the unsolicited communications that are monitored in this implementation are spam email sent by the web site or by other entities that may have obtained the email address from the web site.

Returning briefly to FIG. 1, a number of software components utilized in a distributed implementation of a spam assessment system are illustrated in greater detail. In particular, each client computer 12 incorporates a browser 42 and toolbar 44. Browser 42 may be any number of commercially-available Internet browsers capable of rendering conventional web pages, including web-based forms. Each toolbar 44 may be implemented, for example, as a browser plug in, similar to a number of search toolbars available from a number of search engine providers. Toolbar 44 implements the client-side spam assessment functionality, thereby enabling browser 42 to be of conventional design. In the alternative, the functionality implemented in toolbar 44 may be implemented directly within browser 42, or even in operating system 38 or another application resident in the client computer.

Server computer 14 includes a central service including a messaging service 46 and spam assessment service 48. In the illustrated embodiment, messaging service 46 may be implemented as a mail server that manages the accounts of multiple users. For example, messaging service 46 may be a web-based mail service provided by a service provider, or may be an enterprise mail server. Messaging service 46 may be based on any number of available mail protocols such as POP, IMAP, or HTTP.

Spam assessment service 48 may be implemented, for example, as a plug-in to messaging service 46, or may be integrated directly into the messaging service, or provided as a completely separate service therefrom. It is from within spam assessment service 48 that monitoring of email accounts is performed. In addition, service 48 is configured to respond to queries by client toolbars for the spam scores of various web sites, as well as to log user submissions of email addresses to web sites, which are used to trigger the monitoring of user email accounts by the spam assessment service. In the illustrated embodiment, it is desirable for service 48 to monitor multiple email accounts, and thus enable the potential spam risk associated with a web site to be determined based upon the experiences of multiple users.

It will be appreciated that the functionality described herein may be allocated to different extents between the client and server computers. Therefore, the invention is not limited to the particular implementation discussed herein.

FIG. 3 illustrates a web form processing routine 70 executed by a client browser within which is installed the aforementioned browser toolbar. Routine 70 may be triggered, for example, in response to a user attempting to submit private information through a web form displayed in the user's browser.

Routine 70 begins in block 72 by initiating a loop to process each field in the web form. For each such field, control passes to block 74 to determine whether the value entered is an email address. If so, control passes to block 76 to determine whether the email address is trackable. Various manners of determining whether an address is trackable may be used consistent with the invention. For example, if the spam assessment service is provided by an email provider, an email address may be determined to be trackable if the address is determined to be managed by that email provider, such that all of the accounts that are monitored share a common provider. One such manner of determining whether such an address is trackable is by determining whether the domain for the address is associated with the provider. Other manners of determining whether an address is trackable may be used consistent with the invention.

If the address is trackable, control passes to block 78 to forward the email address, the URL of the current web form, and a time stamp to the spam assessment service. As shown in block 80, the spam assessment service takes the information forwarded by the toolbar and logs a new entry in a tracking list. Block 78 then passes control to block 72 to process additional fields in the web form. Moreover, returning to block 74 and 76, if either of these blocks is answered in the negative, block 78 is bypassed, and control returns directly to block 72.

Once each field in the web form has been processed, block 72 passes control to block 81 to submit the form to the web site, typically through a conventional HTTP request. Routine 70 is then complete.

FIG. 4 illustrates an exemplary implementation of a tracking list data structure 82, which may be suitable for tracking user submissions of private information in a manner consistent with the invention. Tracking list 82 includes a plurality of entries 84. Each entry 84 includes an email field 86, a web site field 88 and a time stamp 90. In the illustrated implementation, user submissions are tracked on a web site-by-web site basis, rather than on a URL or web page-basis. It often may be assumed that submission of private information to any web page in a web site will induce a similar spam risk, irrespective of the particular web page to which that submission occurs. In alternate embodiments, however, submissions may be tracked, and spam risk may be ascertained, on a web page-by-web page basis.

Time stamp field 90 stores a time stamp, e.g., time and date, of a user submission, so that a comparison of email activity may be made between a point in time prior to the user submission and a point of time after the user submission. It will be appreciated that the time stamp may be implemented in different formats, and may require only an indication of a current day, rather than a specific time during the day. Other data structures may be utilized to implement tracking list 82, as will be apparent to one of ordinary skill in the art having the benefit of the instant disclosure.

FIG. 5 illustrates an exemplary implementation of a spam risk list data structure 92, which includes a plurality of entries 94, each including a web site field 96 and a spam score field 98. Each entry associates a spam score with a particular web site, and is thus used to determine the spam risk for a web site whenever requested by a browser toolbar. It will be appreciated that the spam score may be implemented in a number of manners, whether via a numerical value, a rank, a percentage, or another form of relative or absolute indication of spam risk. It will also be appreciated that other data structures may be utilized to maintain spam risk data in other embodiments of the invention.

Figure 6:
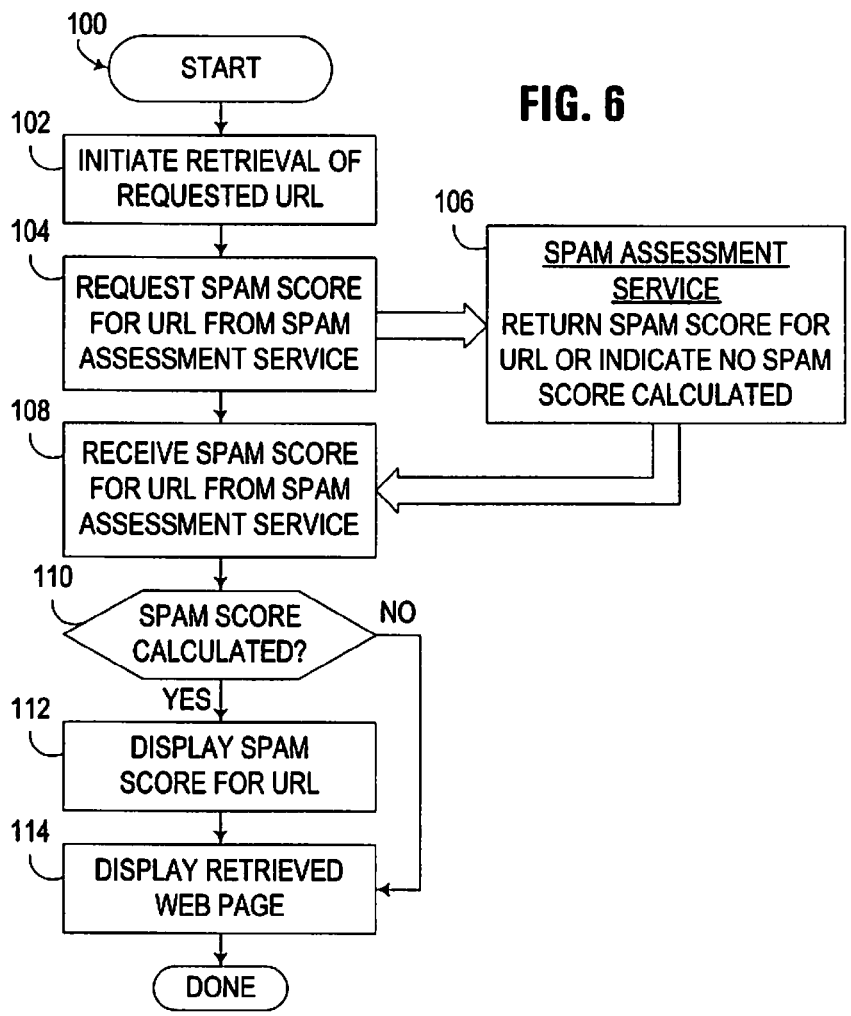
FIG. 6 is a flowchart illustrating the program flow of a page load routine executed by the browser referenced in FIG. 1.

FIG. 6 next illustrates a page flow routine 100 executed either by a client browser within which is installed the aforementioned browser toolbar. Routine 100 is initiated, for example, in response to a request by user to load a particular web page. Routine 100 begins in block 102 by initiating a retrieval of the requested URL for the web page using conventional HTTP request. Next, block 104 requests a spam score for the requested URL from the spam assessment service. As illustrated in block 106, the spam assessment service receives the request from the browser toolbar, determines whether a spam score has been calculated for the URL, and returns either the requested spam score or some indication that no spam score has been calculated, e.g., via a separate flag or a dedicated numerical value. It will be appreciated that the URL forwarded to the spam assessment service may simply identify a web site, rather than a specific web page, e.g., with the browser toolbar sending only the web site domain portion of the URL to the spam assessment service. Alternatively, the full URL may be sent to the spam assessment service, with the spam assessment service deriving the web site address from the full URL. It will also be appreciated that various protocols may be utilized to communicate requests and responses between the browser toolbar and the spam assessment service.

Next, in block 108, the spam score is received from the spam assessment service. Block 110 determines from the response whether a spam score has been calculated, and if so, displays the spam score for the URL to the user, thus notifying the user of the spam risk associated with the URL. Control then passes to block 114 to display the retrieved web page once all the data for the web page has been retrieved. In addition, returning to block 110, if the response from the spam response service indicates that no spam score has been calculated for the URL, block 110 passes control directly to block 114, bypassing block 112. In the alternative, if no spam score has been calculated, the user may be notified that no spam risk assessment data is available for the URL, and thus, that no recommendation can be made about the risk associated with that URL.

Upon completion of block 114, routine 100 is complete. It will be appreciated that in some implementations the download and display of a web page may be performed in parallel with the retrieval and display of a spam score for the web page.

FIG. 7 next illustrates a spam risk assessment routine 120 executed by the spam assessment service, and used to perform spam risk assessment for one or more users. Routine 120 attempts to calculate an average number of emails received per user as a result of submitting an email address to a particular web site. Routine 120 may be executed on a periodic basis, e.g., as a background process that operates in parallel with the user submission tracking and spam score reporting functionality described above in connection with FIGS. 3 and 6.

Routine 120 begins in block 122 by determining a list a web sites that are identified in the tracking list data structure. Block 124 then initiates a loop to process each web site identified in the list. For each such web site, block 126 clears a common score variable, and block 128 clears a pair count variable.

Block 130 then determines a list of email addresses that have been given to the web site, by analyzing the contents of the tracking list data structure. Block 132 optionally determines whether the number of addresses in the list exceeds a predetermined threshold. If not, processing of the web site is complete, and control returns to block 124.

If the number of addresses is above the threshold, control passes to block 134 to initiate a loop that processes pairs of email addresses in the list (i.e., all unique combinations of two email addresses from the list of email addresses). For example, if there were four email addresses A, B, C and D identified in the list, the pairs would be AB, AC, AD, BC, BD and CD.

For each such pair, control passes to block 136 to analyze the messages in the accounts associated with the pair of email addresses. Specifically, block 136 attempts to determine whether the first and second email addresses in the pair have messages in common from a point in time prior to the respective email addresses being provided to the web site. If so, no attempt is made to identify common emails between these two email addresses, and block 136 passes control to block 134 to process other pairs of email addresses. In other embodiments, the fact that two email accounts have similar emails prior to submitting email addresses to a web site will not result in that pair being skipped for analysis.

If no common emails are found, block 136 passes control to block 138 to determine the number of messages in common in the two email accounts since the user submissions of email addresses to the web site by the respective users. This number of messages is then added to the common score variable, and control passes to block 140 to increment the pair count variable. Block 140 then returns control to block 134 to process additional pairs of email addresses.

Once all pairs of email addresses have been processed, block 134 passes control to block 142 to determine whether the common score variable is greater than zero. If not, control returns to block 124 to process other web sites in the list. Otherwise, control passes to block 144 to determine whether a spam risk entry exists for the web site in the spam risk list data structure. If not, control passes to block 146 to create a new spam risk entry for the web site. Once the entry has been completed, or if block 144 determines that an entry already exists, control passes to block 148 to calculate a spam score for the web site by taking the ratio of the common score variable to the pair count variable, and storing the spam score in the appropriate spam risk entry. Control then returns to block 124 to process additional web sites in the list. Once all web sites have processed, routine 120 is complete.

As noted above, routine 120 attempts to calculate or estimate a spam score as an average number of emails received by each user subsequent to submission of an email address to a particular web site. It will be appreciated, however, that any number of alternate techniques may be utilized to calculate a spam score for a web site. For example, a spam score may be based upon the number of detected messages irrespective of whether they are common between multiple email accounts. Furthermore, the determination of whether messages are common to two email accounts may be based upon analyzing the content of the emails and/or analyzing the sender and/or reply addresses associated with the messages. In addition, the messages analyzed may include or exclude messages filtered out by other spam filtering tools. A spam score may be calculated based upon an averaging of multiple calculations over time, and furthermore, the spam score may be scaled as appropriate to represent the relative spam risk associated with a web site (e.g., scaling to a value between 1 and 100, or scaling to a risk level between 1 and 5).

Other manners of determining whether an increase in message traffic or activity has occurred subsequent to the submission of an email address to a web site may be used consistent with the invention. For example, statistical sampling may be performed to determine increased activity in one or more email accounts. In addition, the content of emails, including the body of the messages and/or the sender or reply to addresses, may be analyzed using text analysis, with different degrees of similarity used to determine whether messages are or are not unsolicited emails from a particular web site. It may be desirable, for example, to first determine whether a statically significant increase occurs in message traffic in a user's email account after a user submission of an email address, and then after detecting such an increase, perform content analysis to determine the likelihood that the message traffic has a particular affinity with an entity (e.g., due to sharing a common sender or reply to address, due to common content, due to a match between content and a particular product or service offered by the web site, etc.)

Other indications of the possibility of messages being unsolicited may also be utilized in the analysis. For example, messages containing similar content, but having different sender or reply to addresses may indicate a higher likelihood that the addresses are being spoofed, and thus that the messages are unsolicited. Furthermore, whether or not a particular message has been blocked by a spam filter may be utilized to increase the relevance of the message in spam score calculation.

In addition to or in lieu of analyzing content of emails to determine an affinity between emails received by pairs of users, the content of emails may be analyzed for a particular affinity with a web site, e.g., by attempting to detect emails soliciting specific products or services that are known to be associated with a particular web site. In addition, statistical tracking may take various forms, e.g., by tracking the average number of emails per day, with such statistical tracking looking at the total number of messages received per day, the number of confirmed spam messages received per day, or the number of messages after filtering out emails received from known or approved senders.

In some embodiments, a spam score may further be utilized to indicate that a particular web site is more trusted to not present a significant spam risk, e.g., in the event that no increase in message traffic is detected subsequent to submission of an email address to the web site. In other embodiments, however, no implication may be made as to the trustworthiness of a web site if no spam activity is detected.

As discussed above, in the illustrated implementation, the client-side functionality described herein is implemented in a browser toolbar, e.g., as is available from a number of search engine providers. In this regard, a toolbar incorporating the herein-described functionality may be considered and add-on service for a toolbar that provides other functionality, similar to the manner in which search engine toolbars include add-on functions such as pop up blocking, automated form filling, etc. Indeed, it may be desirable to provide a toolbar as a free plugin to a conventional Internet browser.

Figure 8:
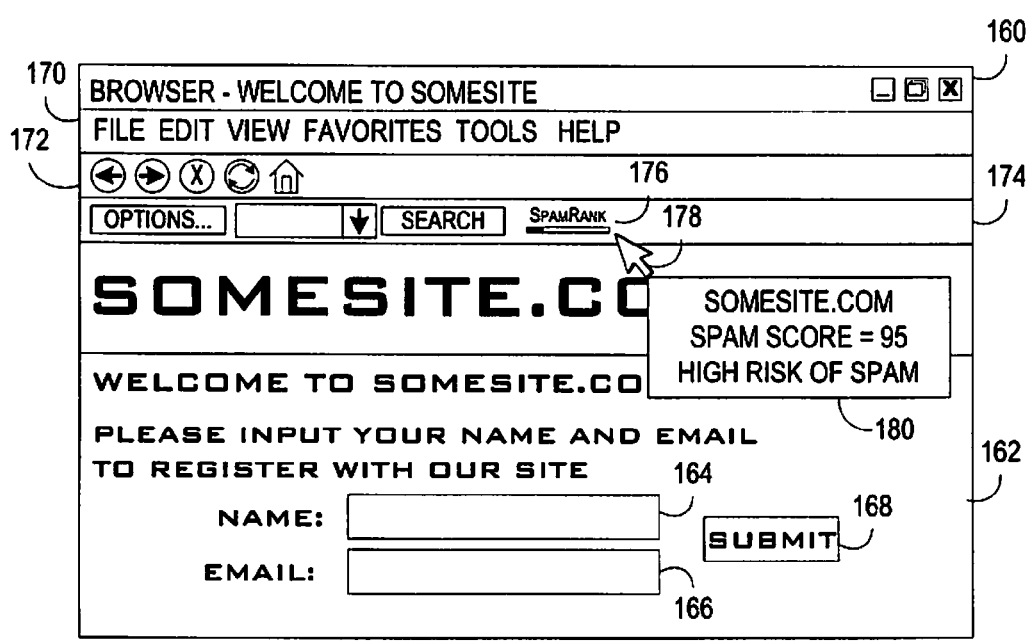
FIG. 8 is a block diagram of an exemplary display window for the browser referenced in FIG. 1.

FIG. 8, or example, illustrates an exemplary browser window 160 for a browser utilizing a toolbar incorporating spam assessment functionality. Window 160 is shown displaying a web page 162 from a web site with a domain of "somesite.com". Web page 162 is a web form including a number of fields, e.g., a name field 164 and an email field 166, through which a user may submit private information. Submission of private information is invoked via a user clicking on a submit button 168.

Browser window 160 is shown with a menu bar 170 as well as a toolbar 172 that may be integrated into the browser. In addition, FIG. 8 illustrates a browser toolbar 174 which includes, among other items, a spam rank icon 176 including a bar graph that illustrates a relative spam risk associated with the currently displayed web page. Moreover, it may be desired in some implementations to enable a user to click on or mouse over icon 176, e.g., by directing a pointer 178 over the icon, to bring up additional information about the spam risk associated with the web page, e.g., via a dialog box 180 that displays the actual spam score for the web page, along with an appropriate warning if the web page presents a high spam risk. It will be appreciated that other manners of displaying the relative or absolute spam score for a web site or web page may be used in the alternative, and moreover, that the display of a spam score may include audio, video, text, graphical information, animations, or any other suitable manner of alerting a user to a potential spam risk for the web page.

Various modifications may be made to the illustrated embodiments without departing from the spirit and scope of the invention. For example, as noted above the functionality described herein may be implemented directly within a browser, or even within an operating system. Moreover, it may be desirable in some embodiments to monitor specific email accounts that users have set up specifically for the purpose of receiving replies from web sites. Many individuals, for example, establish free email accounts through web-based email providers just to provide an email address to web pages that request private information. While users may not check these free email accounts frequently, or otherwise rely on these accounts on a regular basis, these accounts are typically more susceptible to receiving spam, and thus would be a good source of data for determining the spam risk associated with a web site.

It will be appreciated that a wide variety of other modifications may be made consistent with the invention. The invention therefore lies in the claims hereinafter appended.

What is claimed is:

1. A method of assessing a spam risk associated with submitting an email address to a web site, the method comprising:
   for each of a plurality of users, detecting user submissions of email addresses to a web site, wherein the email addresses are associated with email accounts of the respective users;
   in response to a submission of an email address to the web site by a first user among the plurality of users, logging a timestamp associated with such user submission;
   subsequent to detecting the submission of the email address to the web site by the first user, monitoring the email account of the first user for receipt of unsolicited emails associated with the web site;
   determining a spam risk for the web site based upon the monitoring using at least one hardware-implemented processor, wherein determining the spam risk for the web site includes comparing activity in the email account associated with the first user between a point in time prior to the timestamp and a point in time after the timestamp to detect increased activity in the email account associated with the first user; and
   notifying a user visiting the web site of the determined spam risk.

2. A method of assessing a spam risk associated with an entity accessible over an electronic communications medium, the method comprising:
   in response to a user submitting private information solicited by an entity over an electronic communications medium, monitoring an account of the user for receipt of unsolicited communications from the entity subsequent to the user submission; and
   determining a spam risk for the entity based upon the monitoring using at least one hardware-implemented processor;

wherein the private information comprises an email address, wherein the account comprises an email account, wherein monitoring the account comprises monitoring the email account for receipt of unsolicited emails from the entity, wherein the method further comprises monitoring a plurality of email accounts for a plurality of users for receipt of unsolicited emails from the entity, wherein determining the spam risk for the entity is based upon the monitoring of the plurality of email accounts, and wherein determining the spam risk comprises detecting increased activity in the plurality of email accounts.

3. The method of claim 2, wherein the entity comprises a web site.

4. The method of claim 2, wherein determining the spam risk comprises analyzing content of unsolicited emails for an affinity with the entity.

5. The method of claim 2, wherein the plurality of email accounts are supplied by a common provider, the method further comprising determining whether a submitted email address is supplied by the common provider.

6. The method of claim 2, further comprising notifying a second user of the spam risk for the entity in association with the second user being solicited by the entity for private information.

7. The method of claim 6, wherein notifying the second user of the spam risk for the entity is performed by a toolbar executed by the second user's computer.

8. The method of claim 2, further comprising detecting the user submission of private information to the entity.

9. The method of claim 8, wherein detecting the user submission of private information to the entity is performed by a toolbar executed by the user's computer.

10. The method of claim 2, further comprising providing a toolbar to the plurality of users, the toolbar configured to detect user submissions of private information to various entities by the respective users and notify the respective users of spam risks of various entities.

11. The method of claim 10, wherein the toolbar is further configured to communicate with a central service to report user submissions of private information and receive spam risks.

12. The method of claim 2, wherein the private information is selected from the group consisting of an email address, an instant messaging address, a telephone number, and a geographical address.

13. An apparatus, comprising:
   at least one hardware-based processor;
   a memory; and
   program code resident in the memory and configured upon execution by the at least one hardware-based processor to assess a spam risk associated with an entity accessible over an electronic communications medium by monitoring an account of a user for receipt of unsolicited communications from the entity subsequent to the user submitting private information solicited by the entity over the electronic communications medium, and determining a spam risk for the entity based upon the monitoring;
wherein the private information comprises an email address, wherein the account comprises an email account, wherein the program code is configured to monitor the account by monitoring the email account for receipt of unsolicited emails from the entity, wherein the program code is further configured to monitor a plurality of email accounts for a plurality of users for receipt of unsolicited emails from the entity, and wherein the program code is configured to determine the spam risk for the entity based upon the monitoring of the plurality of email accounts by selecting pairs of email accounts among the plurality of email accounts, and, for each pair of email accounts, detecting common emails received by such pair of email accounts subsequent to submissions of email addresses to the entity by the users associated with such pair of email accounts.

14. The apparatus of claim 13, wherein the entity comprises a web site.

15. The apparatus of claim 13, wherein the program code is configured to determine the spam risk by detecting increased activity in the plurality of email accounts.

16. The apparatus of claim 13, wherein the program code is configured to determine the spam risk by analyzing content of unsolicited emails for an affinity with the entity.

17. The apparatus of claim 13, wherein the plurality of email accounts are supplied by a common provider, wherein the program code is further configured to determine whether a submitted email address is supplied by the common provider.

18. The apparatus of claim 12, wherein the program code is further configured to notify a second user of the spam risk for the entity in association with the second user being solicited by the entity for private information.

19. The apparatus of claim 13, further comprising a toolbar configured to be distributed to the plurality of users to detect user submissions of private information to various entities by the respective users and notify the respective users of spam risks of various entities.

20. The apparatus of claim 13, wherein the private information is selected from the group consisting of an email address, an instant messaging address, a telephone number, and a geographical address.

21. A program product, comprising:
   program code configured upon execution by at least one hardware-implemented processor to assess a spam risk associated with an entity accessible over an electronic communications medium by monitoring an account of a user for receipt of unsolicited communications from the entity subsequent to the user submitting private information solicited by the entity over the electronic communications medium, and determining a spam risk for the entity based upon the monitoring; and
   a recordable computer readable medium bearing the program code;
wherein the private information comprises an email address, wherein the account comprises an email account, wherein the program code is configured to monitor the account by monitoring the email account for receipt of unsolicited emails from the entity, wherein the program code is further configured to monitor a plurality of email accounts for a plurality of users for receipt of unsolicited emails from the entity, wherein the program code is configured to determine the spam risk for the entity based upon the monitoring of the plurality of email accounts, and wherein the program code is configured to determine the spam risk by detecting increased activity in the plurality of email accounts.

22. The method of claim 2, wherein detecting increased activity in the plurality of email accounts includes:
   detecting a submission of an email address to the entity by a first user among the plurality of users;
   logging a timestamp associated with the submission of the email address; and
   comparing activity in the email account associated with the first user between a point in time prior to the timestamp and a point in time after the timestamp to detect increased activity in the email account associated with the first user.

23. The method of claim 2, wherein detecting increased activity in the plurality of email accounts includes:
  selecting pairs of email accounts among the plurality of email accounts; and
  for each pair of email accounts, detecting common emails received by such pair of email accounts subsequent to submissions of email addresses to the entity by the users associated with such pair of email accounts to detect increased activity in such pair of email accounts.

24. The apparatus of claim 15, wherein the program code is configured to detect increased activity in the plurality of email accounts by:
  detecting a submission of an email address to the entity by a first user among the plurality of users;
  logging a timestamp associated with the submission of the email address; and
  comparing activity in the email account associated with the first user between a point in time prior to the timestamp and a point in time after the timestamp to detect increased activity in the email account associated with the first user.

\* \* \* \* \*